(12) United States Patent
Hawkins, Jr.

(10) Patent No.: US 12,234,933 B2
(45) Date of Patent: Feb. 25, 2025

(54) ICE CHEST

(71) Applicant: Lancer Corporation, San Antonio, TX (US)

(72) Inventor: John Thomas Hawkins, Jr., Adkins, TX (US)

(73) Assignee: Lancer Corporation, San Antonio, TX (US)

( * ) Notice: Subject to any disclaimer, the term of this patent is extended or adjusted under 35 U.S.C. 154(b) by 56 days.

(21) Appl. No.: 17/709,331

(22) Filed: Mar. 30, 2022

(65) Prior Publication Data

US 2022/0325834 A1 Oct. 13, 2022

Related U.S. Application Data

(60) Provisional application No. 63/168,864, filed on Mar. 31, 2021.

(51) Int. Cl.
*F16L 33/30* (2006.01)
*F25D 31/00* (2006.01)

(52) U.S. Cl.
CPC ............ *F16L 33/30* (2013.01); *F25D 31/002* (2013.01)

(58) Field of Classification Search
CPC ............... F16L 33/30; F25D 31/002
See application file for complete search history.

(56) References Cited

U.S. PATENT DOCUMENTS

| 6,155,069 | A | * | 12/2000 | Quartarone | ......... | B67D 1/0862 |
|---|---|---|---|---|---|---|
| | | | | | | 62/344 |
| 2020/0003348 | A1 | * | 1/2020 | Sinsel | .................... | F16L 41/021 |
| 2021/0018126 | A1 | * | 1/2021 | Elbaz | .................... | F16L 15/007 |

* cited by examiner

*Primary Examiner* — Elizabeth J Martin
*Assistant Examiner* — Samba Nmn Gaye
(74) *Attorney, Agent, or Firm* — Braswell & Associates, P.C.

(57) ABSTRACT

An ice chest (10) with beverage lines (18) in a cold plate (12) is provided in which the inlets and outlets of the cold plate beverage lines are coupled to fittings (16) that accommodate coupling to a wide range of beverage tubing sizes. Also provided are the cold plate (12) and fittings (16).

10 Claims, 5 Drawing Sheets

ICE CHEST

CROSS-REFERENCE TO RELATED APPLICATION AND PRIORITY INFORMATION

This application claims the benefit of, and priority from, co-pending, prior filed U.S. provisional application No. 63/168,864, entitled "Ice Chest", filed Mar. 31, 2021, and which is incorporated herein, in its entirety, by reference.

TECHNICAL FIELD OF THE INVENTION

This invention relates generally to ice chests, cold plates, and fittings.

BACKGROUND OF THE INVENTION

It is often desirable to serve cold beverages. In many applications, the cooling takes place in a cold plate.

A typical cold plate is made of metal, and includes metal beverage lines running through it. For cooling, the cold plate is put in contact with a cold source (generally ice), and beverages—or one or more of their beverage components—are conductively cooled as they flow through the beverage lines in the cold plate, transferring heat to the cold plate.

Cold plates are usually located at the bottom of an ice chest (which is sometimes also referred to as an ice bin). Ice in the chest cools the cold plate, and may also be available for other purposes, for example to be placed in beverage glasses or other containers. For example, in many bar installations, an ice chest is used to hold ice for use in the bar operation, and includes a cold plate for cooling beverage components served through bar guns or through post-mix dispensers.

The beverage lines (tubing) that carry beverage components from their sources to the cold plate, and then from the cold plate to a dispenser (for example, and without limitation, a bar gun or post-mix dispenser), must be coupled to respective inlets and outlets of the beverage lines in the cold plate. This coupling is made through fittings attached to the cold plate beverage lines, which are usually attached by the manufacturer of the cold plate.

Whether for a bar installation or any other installation, and whether within one installation or from installation to installation, different sizes of tubing can be used for the beverage lines that carry the beverage components to and from the cold plate. Therefore, it is necessary to match the cold plate beverage line fittings to the tubing size (or sizes) being used. This results in cold plate manufacturers (and dealers and distributors) having multiple SKUs to accommodate different tubing sizes. And, beyond ice chests, there is a need for more versatile fittings for beverage tubing.

SUMMARY OF THE INVENTION

In accordance with the teachings of the present invention, an ice chest and cold plate are provided, along with a versatile fitting, which eliminate or substantially reduce problems associated with prior art systems.

In one embodiment, an ice chest for containing ice is provided with a cold plate having a plurality of beverage lines within the cold plate, each of the beverage lines including a first end. Also provided is a plurality of fittings, each of the beverage-line first ends coupled to a respective one of the fittings, and each fitting comprising: a first section having a plurality of first-section frustoconical sections, each of the first-section frustoconical sections having a first-section major outside diameter and a first-section minor outside diameter; a second section having a plurality of second-section frustoconical sections, each of the second-section frustoconical sections having a second-section major outside diameter and a second-section minor outside diameter; and wherein the first-section major outside diameter is greater than the second-section major outside diameter.

In another embodiment of the ice chest, each fitting further comprises a transition section between the first and second sections, the transition section having a contour that tapers from the first section to the second section. In some embodiments, the transition section comprises a transition-section frustoconical section adjacent to the first section and a tapered section adjacent the second section. In still further embodiments, adjacent to the first section, the transition section has an outside diameter greater than the first-section minor outside diameter. Also, adjacent to the second section, the transition section may have an outside diameter less than the second-section major outside diameter.

In another embodiment if the ice chest, each of the beverage lines further includes a second end, and further wherein each of the beverage-line second ends is coupled to a respective one of the fittings.

Also provided is a cold plate having a plurality of beverage lines, each of the beverage lines including a first end, and a plurality of fittings, each of the beverage-line first ends coupled to a respective one of the fittings. Each fitting comprises: a first section having a plurality of first-section frustoconical sections, each of the first-section frustoconical sections having a first-section major outside diameter and a first-section minor outside diameter; a second section having a plurality of second-section frustoconical sections, each of the second-section frustoconical sections having a second-section major outside diameter and a second-section minor outside diameter; and wherein the first-section major outside diameter is greater than the second-section major outside diameter.

In another embodiment of the cold plate, each fitting further comprises a transition section between the first and second sections, the transition section having a contour that tapers from the first section to the second section. In some embodiments, the transition section comprises a transition-section frustoconical section adjacent to the first section and a tapered section adjacent the second section. In still further embodiments, adjacent to the first section, the transition section has an outside diameter greater than the first-section minor outside diameter. Also, adjacent to the second section, the transition section may have an outside diameter less than the second-section major outside diameter.

In another embodiment of the cold plate, each of the beverage lines further includes a second end, and further wherein each of the beverage-line second ends is coupled to a respective one of the fittings.

Also provided is a fitting, comprising: a first section having a plurality of first-section frustoconical sections, each of the first-section frustoconical sections having a first-section major outside diameter and a first-section minor outside diameter; a second section having a plurality of second-section frustoconical sections, each of the second-section frustoconical sections having a second-section major outside diameter and a second-section minor outside diameter; and wherein the first-section major outside diameter is greater than the second-section major outside diameter.

In another embodiment, the fitting further comprises a transition section between the first and second sections, the transition section having a contour that tapers from the first section to the second section. In some embodiments, the transition section comprises a transition-section frustoconical section adjacent to the first section and a tapered section adjacent the second section. In still further embodiments, adjacent to the first section, the transition section has an outside diameter greater than the first-section minor outside diameter. Also, adjacent to the second section, the transition section may have an outside diameter less than the second-section major outside diameter.

In a particular embodiment, the fitting has a first section with a plurality of first-section frustoconical sections, each with a respective first-section major outside diameter and a respective first-section minor outside diameter, and a second section with a plurality of second-section frustoconical sections, each with a respective second-section major outside diameter and a respective second-section minor outside diameter, and wherein at least one of the respective first-section major outside diameters is greater than each of the respective second-section major outside diameters.

Important technical advantages are provided by the present invention. In particular, and without limitation, the ice chest of the present invention includes a cold plate suitable for uses with different tubing sizes, thereby eliminating the need for different ice chest SKUs for different systems. Also, the cold plate and versatile fitting disclosed herein allow for coupling with different tubing sizes.

BRIEF DESCRIPTION OF THE DRAWINGS

Reference is made in the description to the following briefly described drawings, which are not drawn to scale, and in which like reference numerals indicate like features.

DETAILED DESCRIPTION OF THE INVENTION

Figure 1A:
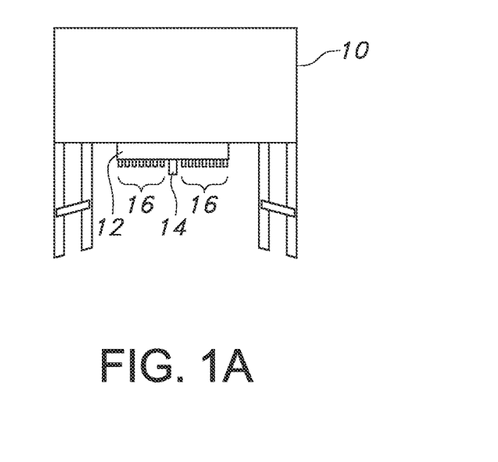
FIGS. 1a and 1b show a slightly perspective view of an ice chest with a cold plate according to certain aspects of the present invention.
Figure 1B:
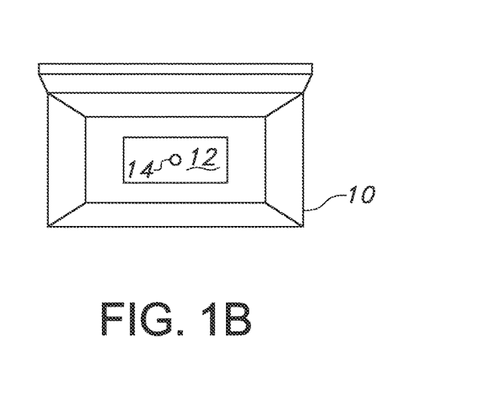

FIGS. 1a and 1b show respective front and top views, at a slight perspective, of an ice chest 10 and cold plate 12. Ice placed within ice chest 10 contacts a top surface of cold plate 12 to cool cold plate 12. Cold plate 12 is shown extending below the bottom of ice chest 10, so that only its top surface is in contact with ice. However, any suitable arrangement may be used, for example, and without limitation, with cold plate 12 raised within ice chest 10 so that the sides (or portions thereof) of cold plate 12 are contacted by ice. A drain 14 for the ice chest 10 is provided through cold plate 12. However, the drain 14 may be placed in any appropriate location, and need not flow through the cold plate 12.

Also shown are fittings 16. As will be discussed in more detail below, these fittings 16 are used to couple beverage tubing to beverage lines that run within the cold plate 12.

Figure 2:
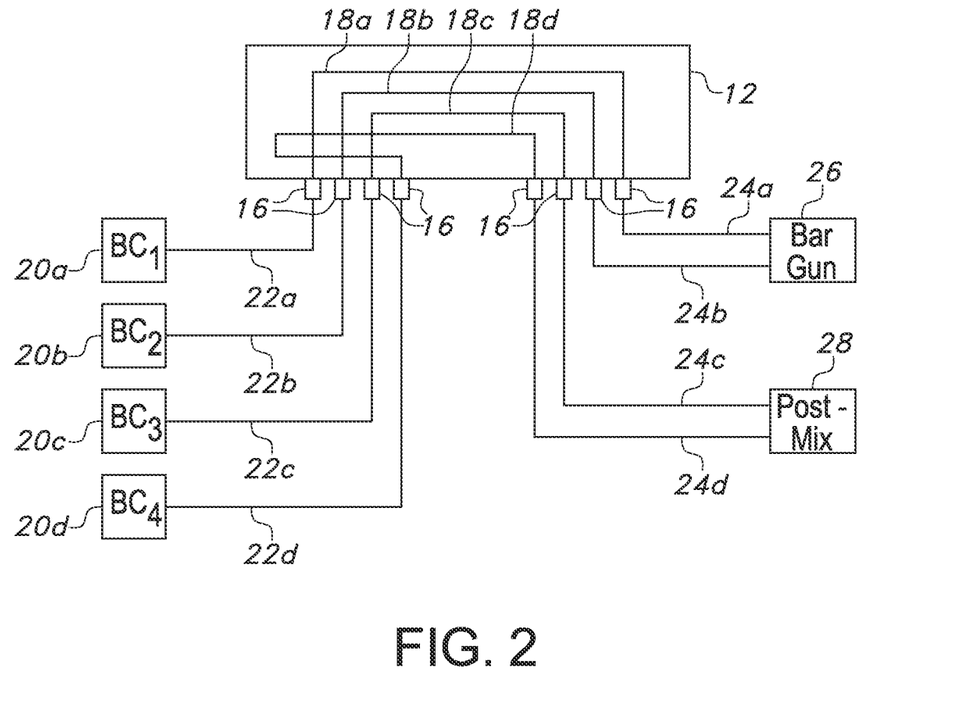
FIG. 2 is a diagram of one embodiment of a system according to certain aspects of the present invention.

FIG. 2 is a diagram of a system according to certain aspects of the present invention. Cold plate 12 includes a plurality of beverage lines 18a-18d. The use of four beverage lines is for an example only, and more or fewer lines may be used. The beverage lines 18a-18d are typically made of metal, and run circuitously through cold plate 12. Often the path they take is coiled, including serpentine-shaped paths among other shapes, and often sections of the lines are spaced apart vertically. However, any path may be used, and the ones depicted are for illustrative purposes only.

Each of the beverage lines 18a-18d has an inlet end and an outlet end, each coupled to a respective fitting 16. Each of the inlet ends, via its respective fitting 16, is in fluid communication with a respective beverage component supply 20a, 20b, 20c or 20d ($BC_1$-$BC_4$) through a respective inlet line 22a, 22b, 22c, or 22d. More or fewer beverage component supplies may be included. The beverage components supplied by the supplies 20a-20d may be, for example and without limitation, syrups, concentrates, premixed beverages, bonus flavors, additives, sweeteners, water (plain or carbonated), or any other beverage component. The beverage component supplies may comprise any suitable source, for example and without limitation, bag-in-box containers, bulk storage, cartridges, municipal water sources, carbonators, and local water supplies. Upstream of fittings 16, inlet lines 22a-22d may couple directly to the beverage component supplies 20a-20d, or may couple indirectly through other lines or components. Any suitable pumps or other suitable supply components (not shown) may be used to draw the beverage components from their supplies to cold plate 12.

Each of the outlet ends of the beverage lines 18, via its respective fitting 16, is in fluid communication with a dispensing system through a respective outlet line 24a, 24b, 24c, or 24d. In the example of FIG. 2, beverage lines 18a and 18b are in fluid communication with a bar gun system 26, and beverage lines 18c and 18d are in fluid communication with a post-mix dispensing system 28. Although two dispensing systems are shown (26 and 28), only one, or more than two, may be used. Downstream of fittings 16, outlet lines 24a-24d may couple directly to the dispensing systems, or may couple indirectly through other lines or components. Furthermore, further plumbing may be used to split any of the beverage lines into multiple streams for use with multiple dispensing systems.

Inlet lines 22a-22d and outlet lines 24a-24d preferably comprise flexible plastic tubing, suitable for beverages.

Figure 3A:
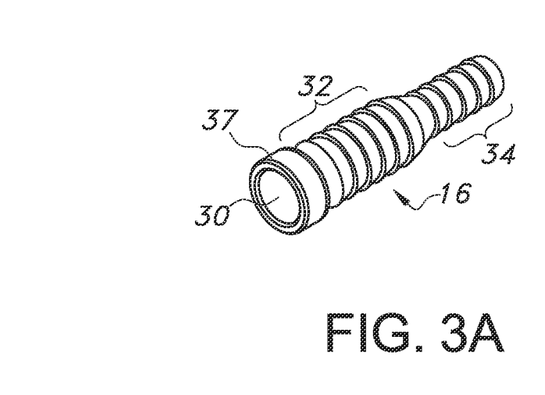
FIGS. 3a-3c illustrate one embodiment of a fitting according to certain aspects of the present invention.
Figure 3B:
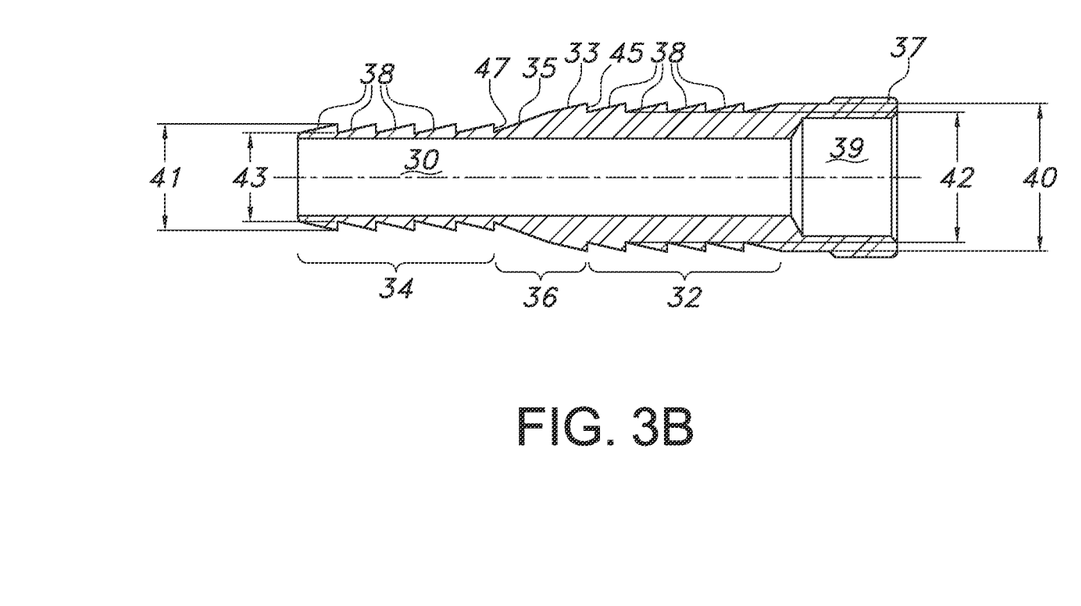
Figure 3C:
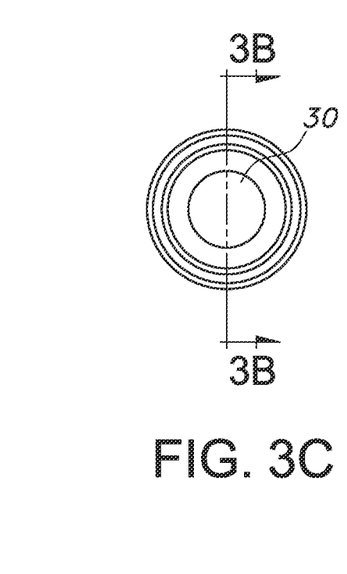

FIGS. 3a-3c (perspective, sectional, and end views, respectively) illustrate one embodiment of a fitting 16 according to certain aspects of the present invention. As shown, fitting 16 is a barbed fitting, having a fluid passageway 30 therethrough, a first section 32 near the end of fitting 16 that is closest to cold plate 12, a second section 34 on the end of fitting 16 opposite first section 32, and a transition section 36 between sections 32 and 34. The end of fitting 16 that attaches to a respective inlet or outlet of the beverage lines 18a-18d is a section 37 having a void 39. In a particular example, and without limitation, the respective inlet or outlet fits in void 39 and is welded to fitting 16.

First and second sections 32 and 34 each comprise a plurality of frustoconical sections 38, with those of first section 32 having larger outside diameters than those of second section 34. The widest part of each of the frustoconical sections 38 has an outside diameter referred to herein as a major outside diameter, and the narrowest part each of the frustoconical sections 38 has an outside diameter referred to herein as a minor outside diameter. Within a respective section, the major outside diameter of each frustoconical section 38 may be the same or some or all of such major outside diameters may be different. Also, within a respective section, the minor outside diameter of each frustoconical section 38 may be the same or some or all of such minor outside diameters may be different.

FIG. 3b shows major outside diameters with reference numerals 40 and 41, for the sections 38 of sections 32 and 34, respectively, and minor outside diameters with reference numerals 42 and 43, for the sections 38 of sections 32 and 34, respectively.

Transition section 36 is a transition area between sections 32 and 34. In the particular example shown, transition section 36 tapers from the bottom section 38 of first section 32 (the section 38 of first section 32 that is farthest from cold plate 12) to the top section 38 of second section 34 (the section 38 of second section 34 that is closest to cold plate 12). The tapering may follow any slope, for example, and without limitation, linear, bent, or curvilinear. In a particular example, as can be seen by reference numeral 45 of FIG. 3b, the transition section 36 flairs radially outward at the bottom section 38 of first section 32 (that is, adjacent to the first section 32, it has an outside diameter greater than the first-section minor outside diameter 42). Furthermore, in this example, transition section 36 terminates (see reference numeral 47 on FIG. 3b) at the top section 38 of second section 34 with an outside diameter that is less than the major outside diameter 41 of that top section 38. However, this is an example only, and transition section 36 may begin and terminate at any suitable outside diameters.

Also, in the example shown in FIG. 3b, the transition section 36 includes a section 33 that has a shape of a frustoconical section 38, followed by a section 35 that tapers further down to section 34. In this particular example, section 33 is considered part of transition section 36. However, section 33 may be considered one of the frustoconical sections 38 of section 32, in which case transition section 36 would include only section 35.

Fitting 16 may be made of any suitable material, and in a preferred embodiment is made of stainless steel. Dimensions for a preferred embodiment of fitting 16 are shown on FIG. 5 (in inches, with metric in brackets). However, these dimensions are examples only, and others may be used without departing from the intended scope of the present invention. The features of FIG. 5 correspond to those of FIG. 3.

Each of the sections 32 and 34 should have a sufficient number of sections 38 (be long enough) to accommodate secure connection to an inlet line 22 or an outlet line 24. In one particular example, each section 32 and 34 includes five frustoconical sections 38, with each of the sections 38 being about 0.105 inches long (in the direction of the longitudinal axis of fitting 16, i.e., parallel to the fluid passageway 30). However, any number of sections 38 may be used, and first section 32 may have a different number of sections 38 than are in second section 34. Also, for clarity, although two sections 32 and 34 are shown, additional such sections may be included, each with its own frustoconical section or sections 38.

Figure 5:
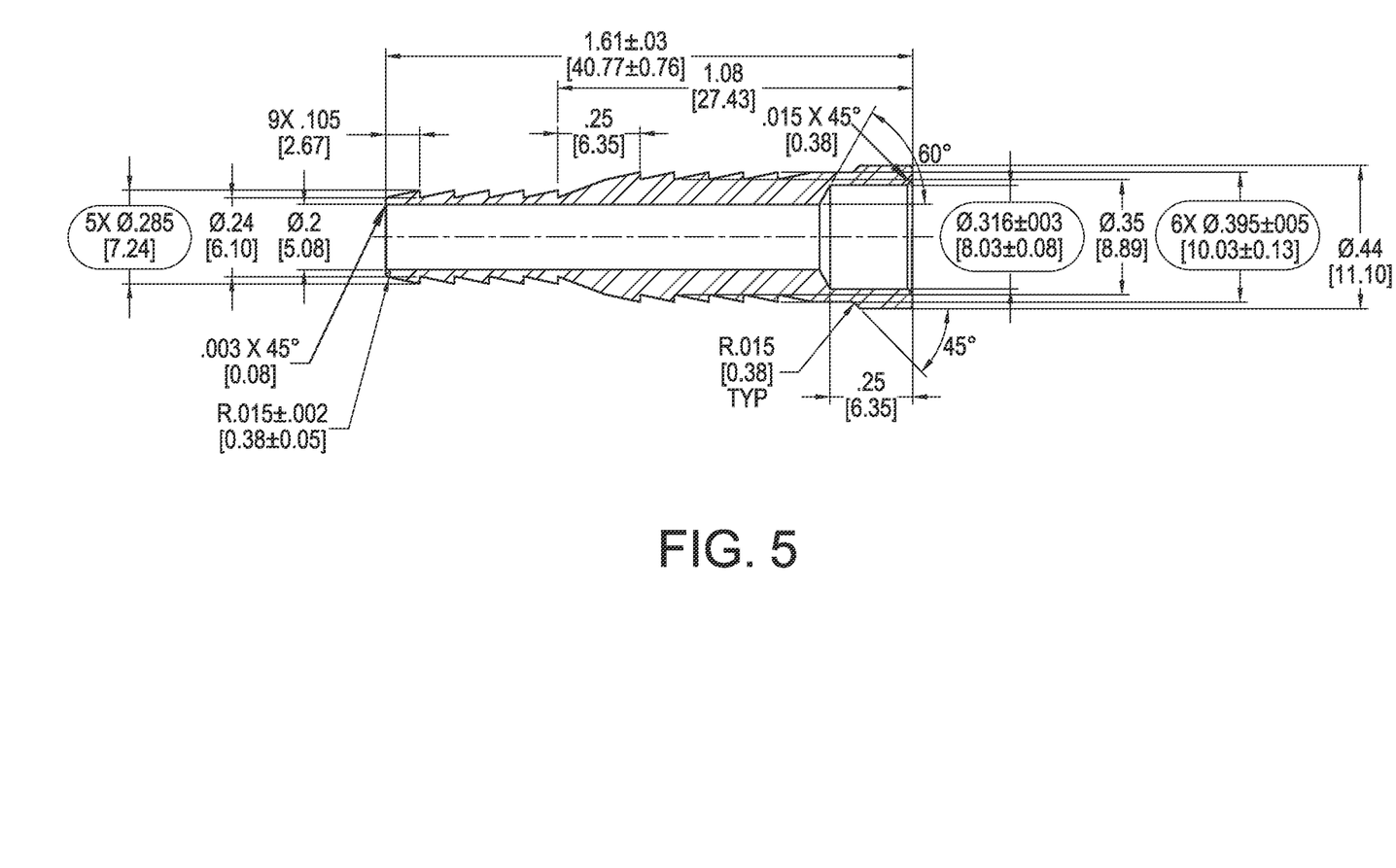
FIG. 5 illustrates various dimensions of one example of a fitting according to certain aspects of the present invention.

In a preferred embodiment, as shown in FIG. 5, each of the frustoconical sections 38 of first section 32 has a major outside diameter of about 0.395 inches and a minor outside diameter of about 0.35 inches, each of the frustoconical sections 38 of second section 34 has a major outside diameter of about 0.285 inches and a minor outside diameter of about 0.24 inches, and transition section 36 is about 0.25 inches long (in the direction of the longitudinal axis of fitting 16, i.e., parallel to the fluid passageway 30, and considering section 33 as part of transition section 36). In a particular example, first section 32 is well-suited for connection to $3/8^{th}$ inch tubing, and second section 34 is well-suited for connection to ¼ inch tubing. However, any suitable sizes may be used for the fitting sections, so long as the frustoconical sections 38 of first section 32 have larger major and minor outside diameters than those of second section 34, such that tubing with relatively smaller inside diameters couple at second section 34, and those with relatively larger inside diameters couple at first section 32. Tubing with intermediate inside diameters may couple at transition section 36 (and may be accompanied with coupling at second section 34). Although it is preferred that each of the major outside diameters of the first-section frustoconical sections 38 be greater than each of the major outside diameters of the second-section frustoconical sections 38, it is within the scope of the present invention if at least one of the major outside diameters of the first-section frustoconical sections 38 is greater than each of the major outside diameters of the second-section frustoconical sections 38.

Figure 4:
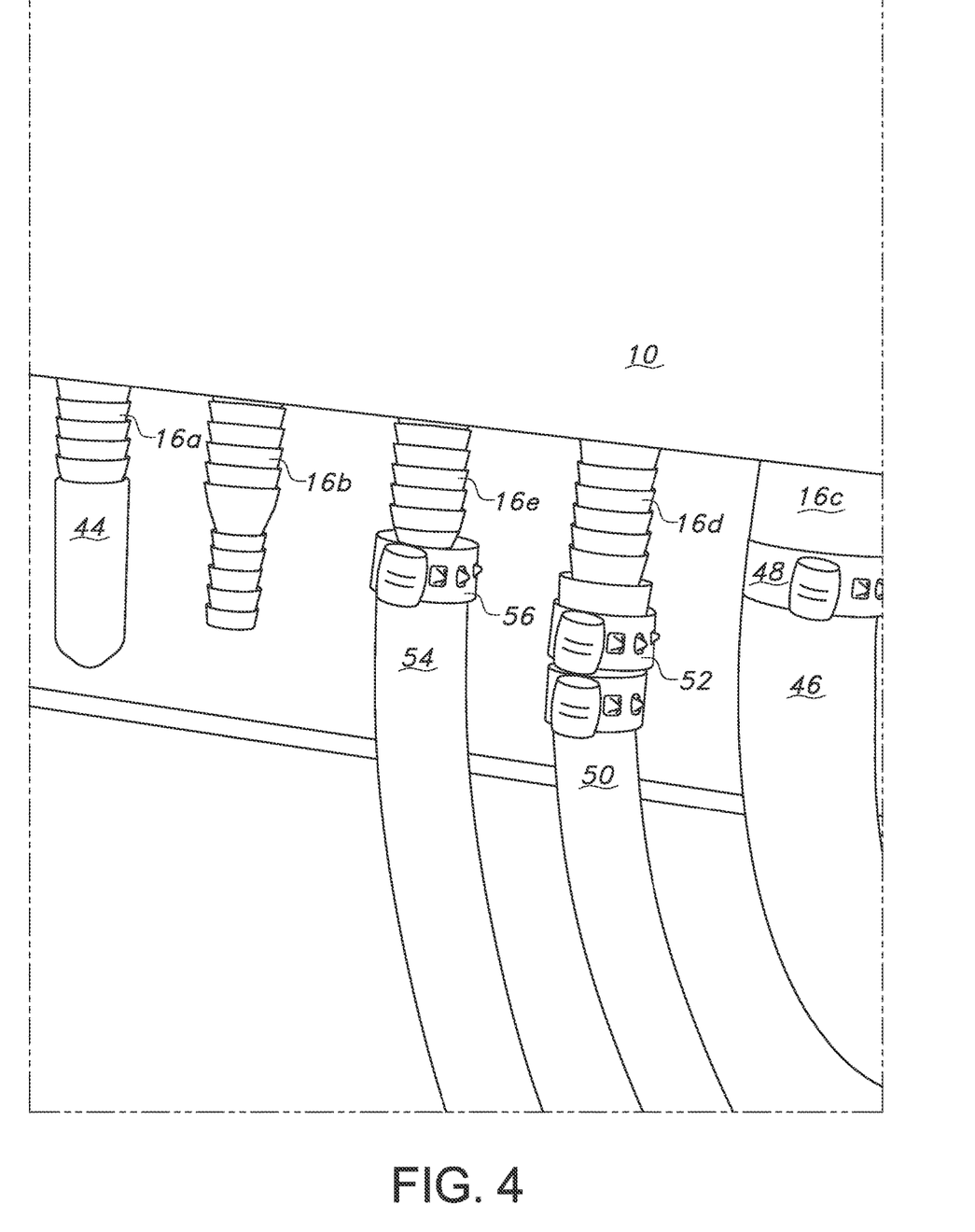
FIG. 4 illustrates a perspective view of cold plate fittings in various states of use according to certain aspects of the present invention.

FIG. 4 illustrates a perspective view of fittings 16a-16e in various states of use according to certain aspects of the present invention, and shows how the fittings 16 accommodate different sizes of tubing. Because it accommodates different sizes of tubing, the ice chest (or cold plate) of the present invention may be installed in a wide range of systems without having to first match the ice chest (and its fitting size) with the particular tubing sizes used in the installation.

A portion of ice chest 10 is shown in FIG. 4, illustrating five fittings 16 illustrated (16a, 16b, 16c (hidden by an attached beverage tube), 16d, and 16e) descending from cold plate 12. Fitting 16a is shown as capped with a flexible cap 44, as it may come from the manufacturer. Fitting 16b is uncapped, ready to receive a beverage tube (e.g., an inlet line 22 or outlet line 24).

Fittings 16c, 16d, and 16e show the fittings connected to beverage tubing (inlet lines 22 or outlet lines 24) of various diameters. Fitting 16c is covered by a beverage tube 46 to which it is coupled. Beverage tube 46 is secured to fitting 16c at its first section 32 with a clamp 48. In this example with fitting 16c, the inside diameter of tube 46 is too great for a proper connection to second section 34, but appropriate for connection to first section 32. In the particular example shown, tube 46 is $3/8^{th}$ inch tubing.

In the next example, a beverage tube 50 is secured to fitting 16d at its second section 34, because the tube 50 has an inside diameter that is too small to connect at first section 32, and so is secured with a clamp 52 at section 34. In the particular example shown, tube 50 is ¼ inch tubing. In this example, tube 50 is covering section 35 of transitions section 36.

In the example illustrated with fitting 16e, a beverage tube 54 covers section 33 of transition section 36, and is secured with clamp 56. Beverage tube 54 has an inside diameter that is too small to connect at first section 32, but too large for ideal connection at section 34. Thus, tube 54 is secured to fitting 16e with clamp 56 at its transition section 36, accompanied with some securing at section 34. In the particular example shown, tube 54 is $5/16^{th}$ inch tubing.

As discussed, each of the inlets and outlets of the beverage lines 18a-18d may be coupled to a respective fitting 16. Alternatively, only some of them may be coupled to fittings 16. For example, and without limitation, in one embodiment, only the outlets of the beverage lines 18a-18d are coupled to fittings 16, with the inlets coupled to conventional fittings. This outlet-only example may often be sufficient, because most variability in beverage tube sizes is found between the cold plate and dispensing systems.

However, attaching fittings 16 to both ends of a beverage line 18 provides significant installation flexibility, not only because it accommodates different sizes of tubing on both the inlet and outlet, but it allows installers flexibility in choosing where to connect each inlet line 22 and outlet line 24. In particular, the designation of one end of beverage line 18 as an inlet and the other as an outlet is somewhat arbitrary, because beverages can flow in either direction within a cold plate. So, either end can be the inlet or the outlet. Accordingly, including the universal fitting 16 of the present invention on both ends of a beverage line 18 allows installers the flexibility to choose which end to connect to an inlet line 22 and which end to connect to an outlet line 24. The symmetry is also useful in eliminating or reducing the need to install the ice chest in a particular orientation due to plumbing constraints.

Although the fitting 16 of the present invention has been discussed in connection with ice chest 10 and cold plate 12, the fitting 16 alone is inventive, and may be used in any suitable application. Similarly, the combination of cold plate 12 and fitting 16 is inventive on its own.

Within this description, coupling includes direct connection and connection through one or more intermediate elements.

Although the present invention has been described in detail, it should be understood that various changes, alterations, substitutions, additions, and modifications could be made without departing from the intended scope of the invention, as defined in the following claims.

What is claimed is:

1. An ice chest for containing ice, comprising:
   a cold plate;
   a plurality of beverage lines within the cold plate, each of the beverage lines including a first end; and
   a plurality of fittings, each of the beverage-line first ends coupled to a respective one of the fittings, and each fitting comprising:
   a first section having a plurality of first-section frustoconical sections, each of the first-section frustoconical sections having a first-section major outside diameter and a first-section minor outside diameter;
   a second section having a plurality of second-section frustoconical sections, each of the second-section frustoconical sections having a second-section major outside diameter and a second-section minor outside diameter;
   a transition section between the first and second sections, the transition section comprising a contour that continuously tapers from the first section to the second section at at least two different slopes and, adjacent to the second section, the transition section comprises an outside diameter less than the second-section major outside diameter; and
   wherein the first-section major outside diameter is greater than the second-section major outside diameter.

2. The ice chest of claim 1, wherein, adjacent to the first section, the transition section has an outside diameter greater than the first-section minor outside diameter.

3. The ice chest of claim 1, wherein each of the beverage lines further includes a second end, and further wherein each of the beverage-line second ends is coupled to a respective one of the fittings.

4. A cold plate, comprising:
   a plurality of beverage lines, each of the beverage lines including a first end; and
   a plurality of fittings, each of the beverage-line first ends coupled to a respective one of the fittings, and each fitting comprising:
   a first section having a plurality of first-section frustoconical sections, each of the first-section frustoconical sections having a first-section major outside diameter and a first-section minor outside diameter;
   a second section having a plurality of second-section frustoconical sections, each of the second-section frustoconical sections having a second-section major outside diameter and a second-section minor outside diameter;
   a transition section between the first and second sections, the transition section comprising a contour that continuously tapers from the first section to the second section at at least two different slopes and, adjacent to the second section, the transition section comprises an outside diameter less than the second-section major outside diameter; and
   wherein the first-section major outside diameter is greater than the second-section major outside diameter.

5. The cold plate of claim 4, wherein, adjacent to the first section, the transition section has an outside diameter greater than the first-section minor outside diameter.

6. The cold plate of claim 4, wherein each of the beverage lines further includes a second end, and further wherein each of the beverage-line second ends is coupled to a respective one of the fittings.

7. A fitting, comprising:
   a first section having a plurality of first-section frustoconical sections, each of the first-section frustoconical sections having a first-section major outside diameter and a first-section minor outside diameter;
   a second section having a plurality of second-section frustoconical sections, each of the second-section frustoconical sections having a second-section major outside diameter and a second-section minor outside diameter;
   a transition section between the first and second sections, the transition section comprising a contour that continuously tapers from the first section to the second section at at least two different slopes and, adjacent to the second section, the transition section comprises an outside diameter less than the second-section major outside diameter; and
   wherein the first-section major outside diameter is greater than the second-section major outside diameter.

8. The fitting of claim 7, wherein, adjacent to the first section, the transition section has an outside diameter greater than the first-section minor outside diameter.

9. A fitting, comprising:
   a first section having a plurality of first-section frustoconical sections, each of the first-section frustoconical sections having a respective first-section major outside diameter and a respective first-section minor outside diameter;
   a second section having a plurality of second-section frustoconical sections, each of the second-section frustoconical sections having a respective second-section major outside diameter and a respective second-section minor outside diameter;
   a transition section between the first and second sections, the transition section comprising a contour that continuously tapers from the first section to the second section at at least two different slopes and, adjacent to the second section, the transition section comprises an outside diameter less than the second-section major outside diameter; and wherein at least one of the respective first-section major outside diameters is greater than each of the respective second-section major outside diameters.

10. The fitting of claim 9, wherein, adjacent to the first section, the transition section comprises an outside diameter greater than the first-section minor outside diameter.

* * * * *